United States Patent [19]

Slavenburg

[11] Patent Number: 4,750,108
[45] Date of Patent: Jun. 7, 1988

[54] DATA PROCESSOR UNIT COMPRISING A CONTROL SECTION WHICH COMPRISES AN ADDRESS GENERATOR FOR GENERATING ADDRESSES WHICH ARE COMPOSED OF CHARACTERISTIC ADDRESS PORTIONS

[75] Inventor: Gerrit A. Slavenburg, Eindhoven, Netherlands

[73] Assignee: U.S. Philips Corporation, New York, N.Y.

[21] Appl. No.: 918,681

[22] Filed: Oct. 15, 1986

Related U.S. Application Data

[63] Continuation of Ser. No. 565,565, Dec. 27, 1983, abandoned.

[30] Foreign Application Priority Data

Dec. 31, 1982 [NL] Netherlands ............ 8205076

[51] Int. Cl.⁴ .................................................. G06F 9/22
[52] U.S. Cl. ......................................................... 364/200
[58] Field of Search ... 364/200 MS File, 900 MS File

[56] References Cited

U.S. PATENT DOCUMENTS 3,990,054 11/1976 Perlowski ............... 364/200
3,991,404 11/1976 Brioschi ................. 364/200
4,038,643 7/1977 Kim ....................... 364/200
4,126,896 11/1978 Yamazaki ............... 364/200
4,173,041 10/1979 Dvorak et al. ......... 364/200
4,179,737 12/1979 Kim ....................... 364/200

OTHER PUBLICATIONS

Tanenbaum, "Structured Computer Organization", 1976, Prentice-Hall, pp. 74 & 69.

Primary Examiner—David Y. Eng
Attorney, Agent, or Firm—James J. Cannon

[57] ABSTRACT

A data processor unit comprising an instruction register for temporary storing a macro-instruction having at least an opcode part and being supplied thereto, and a control section which comprises a sequencer and a microcode memory connected to each other. In said microcode memory there being stored a number of handlers each comprising a number of micro-instruction words. For each opcode there is provided a dedicated handler. The micro-instruction words of handler forming a microroutine for controlling the execution of at least part of a processor action indicated by the corresponding opcode. A handler being addressed by an address generator included in the sequencer and under control of his appertaining opcode.

3 Claims, 5 Drawing Sheets

DATA PROCESSOR UNIT COMPRISING A CONTROL SECTION WHICH COMPRISES AN ADDRESS GENERATOR FOR GENERATING ADDRESSES WHICH ARE COMPOSED OF CHARACTERISTIC ADDRESS PORTIONS

This is a continuation of application Ser. No. 565,565, filed Dec. 27, 1983, and now abandoned.

BACKGROUND OF THE INVENTION

1. Field of the Invention

The invention relates to a data processor, comprising a processing section, a control section and a communication section for information transport between said sections, said control section comprising a microcode memory and a sequencer, said communication section comprising an instruction register for storing macroinstructions each comprising an opcode an output of said instruction register being directly connected to a first input of the sequencer, said microcode memory storing a number of handlers, each of which comprises at least one micro-instruction word, a second input of said sequencer being connected to a data output of the microcode memory while a first output of said sequencer is connected to an address input of the microcode memory, said sequencer furthermore comprising an address generator for generating addresses for the microinstruction words, said address generator comprises a first and a second sub-address generator.

2. Description of the Prior Art

A data processor of this kind is known from French Patent Application No. 79 26362 (publication No. 2 440 030). The known data processor processes data, thus generating control data. The data to be processed is usually presented to the data processor in the form of instructions, mainly macro-instructions. The macroinstructions are stored in the instruction register before being processed by the data processor.

The address generator of the sequencer generates a start address for addressing a micro-instruction word which is stored in the microcode memory and which forms part of a handler. A handler contains the control data for controlling the data to be processed. The micro-instruction words of a handler contain an address field in which address data is stored for the addressing of the next micro-instruction word by the address generator. Thus, data is processed by the data processor under the control of successive micro-instruction words. The required control data is output on a further output of the microcode memory. Because the data processor must usually process data in different ways, for example read operations, arithmetic operations, write operations etc., a number of handlers are also stored in the microcode memory for this purpose. Each of these handlers in its turn contains control data for the control of a given operation. The microcode memory is subdivided into a plurality of zones which have substantially the same storage capacity. The address generator contains a first and a second sub-address generator. The first sub-address generator generates an address of a micro-instruction within a zone, whilst the second sub-address generator addresses the zone itself.

By utilizing two sub-address generators, the known data processor aims to increase the number of macro-instructions to be processed. However, it is a drawback of this set-up that the available storage capacity is inefficiently used. For example, when the microcode memory is subdivided in four zones but the macro-instruction to be processed is executed in only three steps, one unused memory location will be present in the fourth zone. Furthermore, the various micro-instruction words required for the execution of a macro-instruction are distributed among the various zones, so that very frequent jumping to another zone will occur. This time consuming, because the zones are formed on the basis of an equal distribution of the available storage capacity. The storage capacity required by a handler is not taken into account in the known data processor.

SUMMARY OF THE INVENTION

It is the object of the invention to provide a data processor in which the available storage capacity is more efficiently used, in which the division of the available storage capacity takes into account the storage capacity required by a handler, and in which the execution time is reduced.

To this end, the invention provides a data processor, comprising a processing section, a control section and a communication section for information transport between said sections, said control section comprising a microcode memory and a sequencer, said communication section comprising an instruction register, an output of which is directly connected to a first input of said sequencer, said microcode memory storing a number of handlers, each of which comprises at least one microinstruction word, a second input of said sequencer being connected to a data output of said microcode memory while a first output of said sequencer is connected to an address input of said microcode memory, said sequencer furthermore comprising an address generator for generating addresses for said microinstruction words, which address generator comprises a first sub-address generator for generating a first sub-address for addressing a handler within said number of handlers and a second sub-address generator for generating a second sub-address for addressing an individual microinstruction word within said handler addressed by said first sub-address, said first and second sub-addresses each determining an exclusive portion of said address, said microcode memory having m microinstruction word storage locations and being provided with an address decoder having n address input bit lines, where $2^n$ is greater than m, which address decoder includes an AND-gate corresponding to each storage location and having its output connected to said corresponding storage location, said AND-gates being each provided with the same number of input lines which together form a matrix with said address bit lines to define address bit decoding cells at the cross-points thereof, said cross-points being programmed so that said address decoder will address a storage location for each of m n-bit addresses applied to said address bit lines.

Said first and second sub-address generators each generate a sub-address, the sub-addresses thus forming the address for the microinstruction word. A first sub-address concerns a handler and a second sub-address concerns a word within said handler in question. This means that the capacity required by said handlers is taken into account in the sub-division of the available storage capacity. From the content of the macroinstruction as stored in the instruction register it is now directly determined which handler is required for the control of the processing of this data. Moreover, thanks to the use of sub-addresses, the address field is now much smaller, so that operations can be performed in a simpler and hence faster manner.

Said number of handlers may be made up from at least two different groups of handlers and said first sub-address generator may comprise first and second sub-address-portion generators for generating, respectively, a first sub-address-portion for addressing an individual group within said different groups and a second sub-address-portion for addressing an individual handler within the group addressed by the first sub-address-portion. If there are three different groups of handlers, that is to say the micro-subroutines, the special handlers and the instruction handlers then, due to the assignment of a sub-address-portion to each of these groups, an address for a microinstruction word comprises three portions which are separately processed by the sequencer, so that these addresses can be simply and quickly manipulated.

Thanks to the particular choice of the addresses for the microinstruction words, that is to say a first, a second and possibly a third sub-address, not all feasible address combinations which can be formed using a given word length (number of bits) are required for an address word. This is because the number of addresses to be used is determined by the number of handlers, the number of microinstruction words in a handler, and eventually the number of groups of handlers. This address choice has consequences for the implementation of the address decoder of the microcode memory which thus occupies a smaller chip surface area, so that the microcode memory itself also occupies a smaller chip surface area.

BRIEF DESCRIPTION OF THE DRAWINGS

An embodiment of the invention will be described in detail hereinafter with reference to the drawings; wherein

FIGS. 3c and d show, by way of example, how the addresses can be formed and at the same time illustrate the relationship between the addresses and the microinstruction words;

DESCRIPTION OF THE PREFERRED EMBODIMENT

Figure 1:
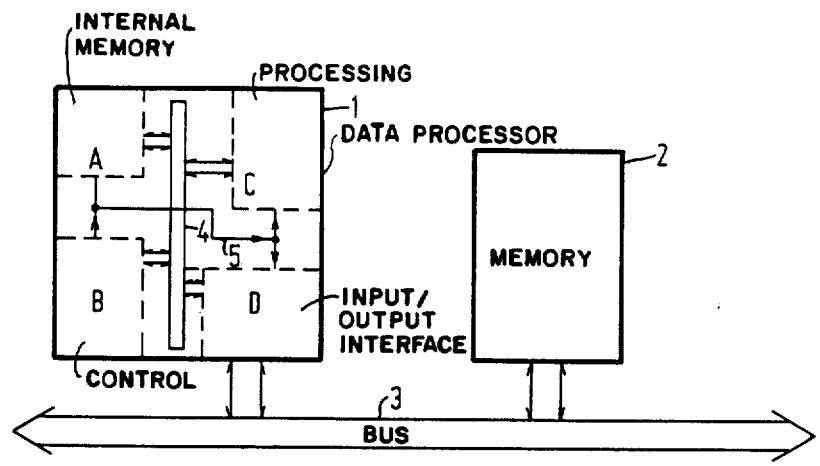
FIG. 1 shows the principal constituent parts of a data processing system.

A data processing system as shown in FIG. 1 comprises inter alia a data processor (1) and a main memory (2). The data processor and the main memory are connected to a bus 3 on which data circulate. As in other data processing systems, further units (not shown) may also be connected to the bus. The data processor (1) comprises several sections. In particular, it comprises an internal memory section A, a control section B, a processing section C and an input/output interface section D. All sections A, B, C and D are connected to an internal bus 4 so that they are capable of exchanging data. The control section B despatches control signals to each of the other sections via the line 5.

The invention relates to the control section B of the data processor unit, notably to an implementation of this control section B. By generating control signals, the control section ensures that the data to be processed are treated in a specified manner at the appropriate locations.

Figure 2:
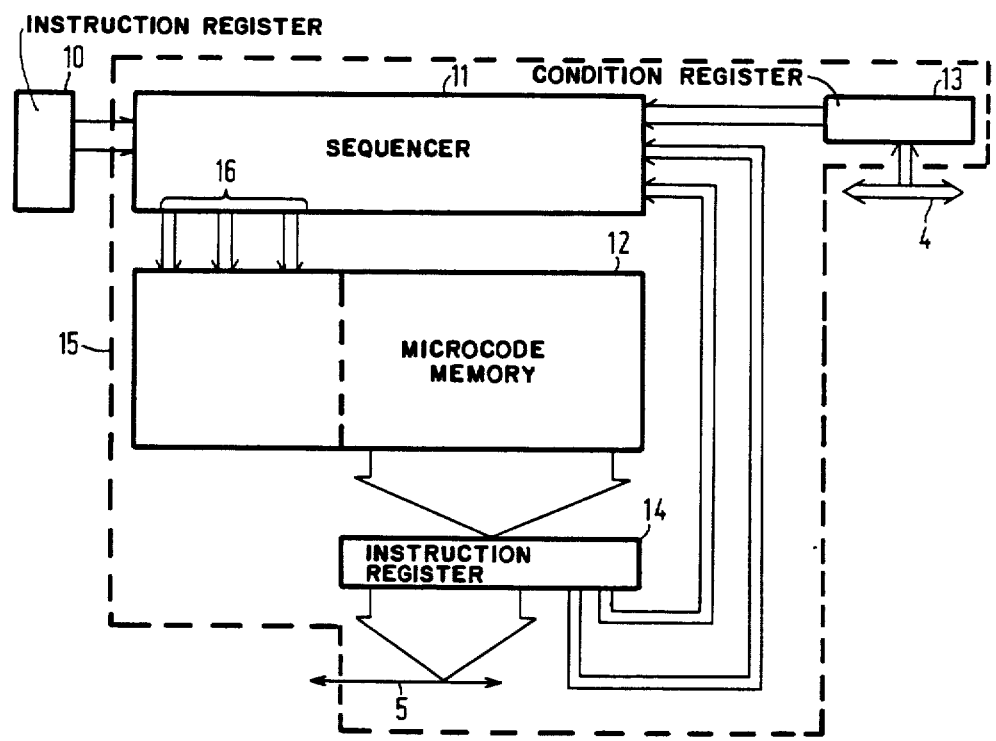
FIG. 2 shows an example of the implementation of a control section of a data processor unit.

The system 15 of FIG. 2 is an example of an implementation of a control section of a data processor unit in accordance with the invention. The control section 15 comprises a sequencer 11 which comprises a first input which is connected to a condition register 13 and a second input which is connected to an instruction register 10. An output gate system 16 of the sequencer is connected to an address input of a microcode memory 12. A data output of the microcode memory 12 is connected to an input of a micro-instruction word register 14, a first output of which is connected to the line 5 of the data processor. A second and a third output of the micro-instruction word register 14 are connected to a third and a fourth input, respectively, of the sequencer 11. The micro-instruction word register and the output lines connected thereto constitute a "pipeline assembly line". The term "pipeline assembly line" is defined, for example, on pages 84 and 85 of the book "Computer Structures Reading and Examples", by C. G. Bell and A. Newell, published by McGraw Hill Book Company (1971).

The instruction register 10 forms part of the input-/output interface section D of the data processor. The instruction register 10 each time stores a binary code for the next instruction of the program being executed by the data processor. The instructions of the current program originate from the main memory (2 in FIG. 1) or from another unit connected to the bus 3. These instructions are "macro-instructions", i.e. instructions formulated in compact a macro-instruction comprises an opcode part and an operand descriptor part form. An example of such a macro-instruction is "ADD $R_1$, $R_3$". Thus formulated this macro-instruction denotes an operation during which the content of the register $R_1$ is to be added to the content of the register $R_3$. The control section of the data processor translates the macro-instruction stored in the instruction register into micro-instructions which are subsequently executed by the processing section C. The matro-instruction "ADD $R_1$, $R_3$" is thus translated into for example, the micro-instructions:

$R_1 \rightarrow$ ALU 1: transfer the content of register $R_1$ to the first input of the ALU (Arithmetic Logic Unit). (The ALU forms part of the processing section C of the data processor unit).

$R_3 \rightarrow$ ALU 2: transfer the content of the register $R_3$ to the second input of the ALU.

ALU$\rightarrow R_3$ : write the result present on the output of the ALU in register $R_3$.

PC+1$\rightarrow$MEMADR: set the program counter PC to the next memory address in the memory in which the current program is stored.

PC+1$\rightarrow$PC: increment the program counter by one unit.

MEM$\rightarrow$IR: read the content of said next memory address and write it in the instruction register.

The last three micro-instructions (almost) always occur during the execution of macro-instructions. The micro-instructions are stored in the microcode memory 12 in the form of micro-instruction words. Each microinstruction word is addressed by way of a unique address presented to the address input of the microcode memory. This address originates from the sequencer 11 which outputs the address on the output gate system 16. In the present example, the address is composed of three characteristic portions. These three characteristic portions identify the associated micro-instruction word. For a proper understanding of this aspect, it is first of all necessary to consider the content of the microcode memory 12 first. Subsequently, the formation of the address in the sequencer 11 will be described, and then the operation of the control section 15.

Figure 3A:
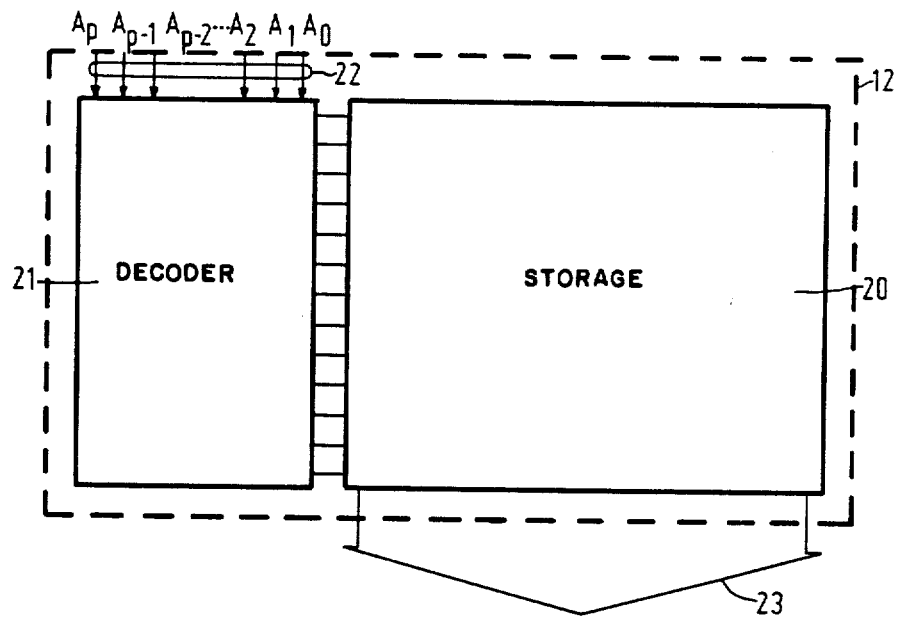
FIG. 3a shows the various parts of a microcode memory of the control section of a data processor unit.

FIG. 3a shows an example of an internal structure for the microcode memory 12. The microcode memory comprises a storage section 20 and an address decoder section 21 which is connected thereto. With each address of the address decoder section 21 there is associated a microinstruction word from the storage section. The address is presented to an address input 22 and the micro-instruction word associated with the address presented is output on a data output 23. The microcode memory comprises, for example, an AND-matrix structure for the decoding of the address signal and an OR-matrix structure for defining the micro-instruction words stored in the storage section.

Figure 3B:
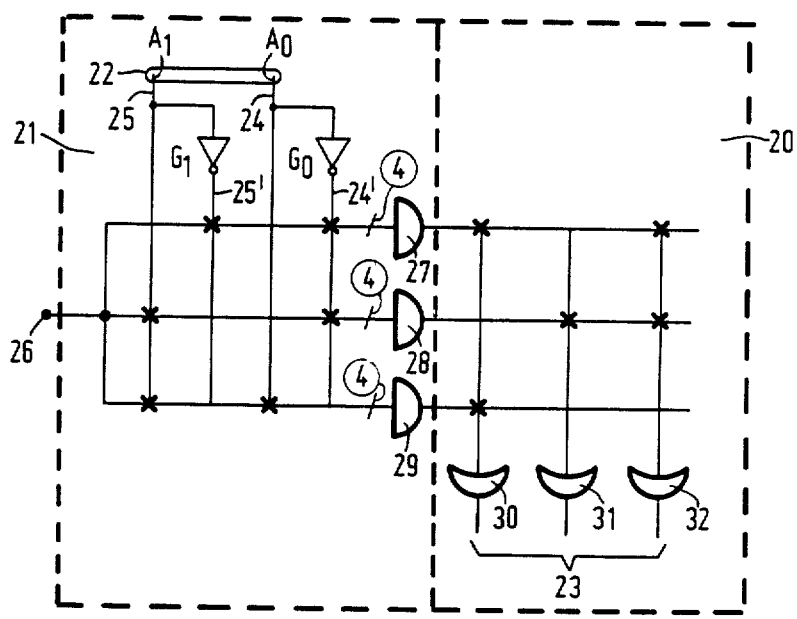
FIG. 3b shows a simple example of the structure of a microcode memory.

FIG. 3b illustrates such a microcode memory structure on the basis of a simple example. The address presented to the address input 22 has a width of, in this example, two bits ($A_1A_0$). For each address bit there is provided an address line, that is to say an address line 24 for the address bit $A_0$ and an address line 25 for the address bit $A_1$. At the input of the address section each address line is connected to the input of an inverter ($G_0$, $G_1$) associated with this address line. An output of each inverter ($G_0$, $G_1$) is connected to a sub-address line (24' and 25', respectively). The address lines and the sub-address lines constitute the columns of the matrix. Transistors which are denoted by means of a cross are provided for the decoding of the address data there. The transistors constitute the elements of the matrix which elements are situated at the cross-points of the rows and the columns. The address lines and the sub-address lines are connected to a first electrode (for example the base) of such a transistor. A second electrode (for example the collector) of such a transistor is connected to a point 26 whereto a voltage source is connected. This voltage source (not shown in the Figure) supplies a voltage which represents, for example, the logic value "1". A third electrode (for example the emitter) of such a transistor is connected to an input of a logic AND-gate (27, 28, 29). In this example four inputs are provided for each logic AND-gate. For the sake of clarity of the drawing, only a single input is shown. It is a special aspect of this structure that not all cross-points are provided with such a transistor (there are cross-points without a cross), i.e. the corresponding transistor is omitted at given cross-points (this is achieved in practice by short-circuiting of the transistor). Such a cross-point without a transistor always carries the logic value "1", regardless of the value of the address bit. Each row in the example shown in FIG. 3b is provided with only two transistors. It is an advantage of such a structure that the address choice for the micro-instruction words to be addressed is completely arbitrary.

In the example shown in FIG. 3b, the address $A_1A_0=00$ addresses the micro-instruction word on the first row of the storage section (value logic "1111" on the four inputs of the logic AND-gate 27). The addresses $A_1A_0=10$ and $A_1A_0=11$ address the micro-instruction word on the second and the third row, respectively, of the storage section. The address $A_1A_0=01$ is not decoded in this structure and is not used as an address. Thanks to this freedom in the choice of the addresses, a link can be established between the value of the address and the micro-instruction word indicated by this address.

The storage section has a structure which is analogous to that of the address section. However, therein each column is connected to a logic OR-gate (30, 31, 32). Therefore, the structure of the data storage section is referred to as an OR-matrix structure.

A memory of this kind in which many addresses are not hardware implemented will be referred to as a "sparse" memory hereinafter. Due to the particular implementation of the address decoder the data storage section of such a sparse memory has a storage capacity which is smaller than the storage capacity of a normal memory addressable with an address of equal bit length. Thus if the address decoder has a capacitor for decoding an N bits address word, then the storage capacity of the data storage section is less than $2^N$ instruction words.

Figures 3C, 3D:
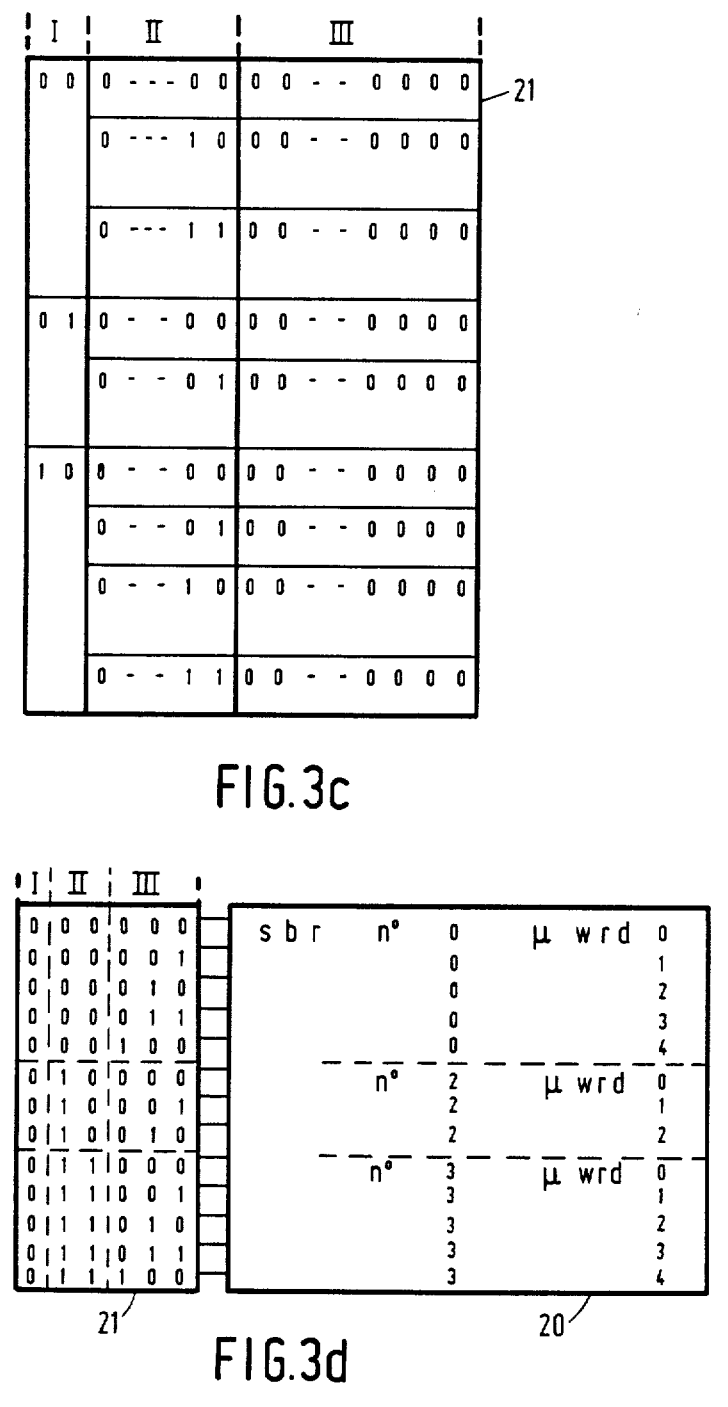

As has already been stated in the description given with reference to FIG. 2, each address signal comprises three characteristic portions in this embodiment. FIG. 3c shows the address decoder portion of the memory 12 of FIG. 3a and FIG. 2; these three characteristic portions will be illustrated on the basis of an example. The idea to use three characteristic portions to compose an address for a memory of a control section of a data processor unit is based on the fact that only a limited number of types of micro-instruction can be distinguished. A distinction is made for example between four types of micro-instruction:

1. addressing a micro-subroutine;
2. jumping to a handler for a new macro-instruction;
3. jumping to special handler routines such as, for example error handler routines or a fetch routine;
4. the jumping within a handler.

Because a sparse memory is used for the microcode memory, the freedom of choice as regards the addresses which is offered by such a sparse memory is used to link the addresses to the micro-instruction words. An address for this sparse memory is composed of three characteristics portions and thus forms a triplet. As appears from FIG. 3c, this triplet comprises the following portions I an indication of the type of handler;
II an indication of the number of the handler within a type; and
III an indication of the particular micro-instruction word within a handler.

The constituents of this triplet will now be described in detail.

I. An indication of the type of handler.

This portion has a width of, for example two bits, as shown in FIG. 3c and indicates the type of handler. For example, it indicates:

00: micro-subroutine (handler of the first type)
01: the special handlers (handler of the second type)
10: the instruction handlers (handler of the third type), i.e. handlers for the execution of macro-instructions.

In this embodiment, an address for the sparse memory which starts with 00 always refers to a microsubroutine and, conversely, the address of a micro-subroutine stored in the sparse memory also always has 00 as the bit values for the first two bits. The addresses of special handlers and instruction handlers stored in the sparse memory always have the values 01 and 10, respectively, for the first two bits. Thus a first coarse distinction is obtained between the different types of micro-instructions and the way in which they are stored in the sparse memory. This coarse distinction is refined by the two other portions of the triplet.

II. An indication of the number of the handler within a type.

This portion has a width of k bits (for example, k=8) so that each type can comprise at the most $2^k$ different handlers. Thanks to the use of a sparse memory, however, it is not necessary to utilize all these possibilities; this type of memory offers the possibility of reserving as many different address numbers for each type of handler as there are handlers within the relevant type. The different handlers of one given type are numbered, (successively or not) from 0 to I ($0 \leq I \leq 2^k - 1$). In the example of FIG. 3c there are three different handlers numbered 0 ... 00, 0 ... 10 and 0 ... 11 for the handlers of the first type. For the handlers of the second type there are two different handlers numbered 0 ... 00 and 0 ... 01, and for the handlers of the third type there are four different handlers numbered 0 ... 00, 0 ... 01, 0 ... 10 and 0 ... 11. As is demonstrated by the handlers of the first type in the example of FIG. 3c, successive numbering of the various handlers belonging to a given type is not necessary. As has already been stated, this freedom in the assignment of numbers which act as an address is made possible by the use of a sparse memory.

III. An indication of the micro-instruction word within a handler.

This portion has a width of p bits (for example, p=8) so that at the most $2^p$ micro-instruction addresses are available for each handler separately. This means that each handler may comprise a maximum of $2^p$ micro-instruction words. By means of the third portion (III) of the triplet, the micro-instruction words are then numbered O to N ($O \leq N \leq 2^p - 1$). Thanks to the use of a sparse memory it is again not necessary to use all $2^p$ addresses provided for each handler; each time as many addresses can be used as there are micro-instruction words present in the relevant handler.

The relationship between a triplet address and a micro-instruction word will be illustrated on the basis of the example shown in FIG. 3d. In this example, the portion I (indication of the type of handler) comprises one bit, the portion II (indication of the number of the handler within a type) comprises two bits, and the portion III (indication of the micro-instruction word) comprises three bits. It is assumed that a handler of the first type is concerned, i.e. a micro-subroutine (sbr), and that there are three different micro-subroutines. The fact that a micro-subroutine is concerned is indicated by the bit value "0" in the first column (I) of the address matrix in the address decoder section 21. The second and the third column, together forming the portion II of the triplet for each row, reveal that the micro-subroutines bearing the number 00 (No. 0), the number 10 (No. 2) and the number 11 (No. 3) are stored in this section of the microcode memory. The micro-subroutine bearing the number 01 is absent; this is permissible in view of the freedom offered by the use of a sparse memory. The fourth, the fifth and the sixth column, together forming the portion III of the triplet for each row, indicate for each row the addresses of the successive micro-instruction words of each micro-subroutine. In the example shown in FIG. 3d, the micro-subroutine bearing the number 00 comprises five micro-instruction words ($\mu$um wrd 0 ... 4); the microsubroutine bearing the number 10 comprises three microinstruction words ($\mu$m wrd 0 ... 2), and the micro-subroutine bearing the number 11 comprises five micro-instruction words ($\mu$m wrd 0 ... 4). The five micro-instruction words of the micro-subroutine bearing the number 00 contain a consecutive binary numbering from 000 ... 100 for the portion III of the triplet address. For the three micro-instruction words of the micro-subroutine bearing the number 10, the portion III of the triplet address comprises a consecutive binary numbering from 000 to 010. For the micro-subroutine bearing the number 11 the micro instruction words, are also numbered consecutively in a similar manner. The example shown in FIG. 3d thus illustrates how the data is stored in the sparse memory and how the value of the address associated with each micro-instruction word is chosen.

Evidently, the choice of this particular form for the addresses has consequences for the implementation of the sequencer 11 of FIG. 2.

Figure 4:
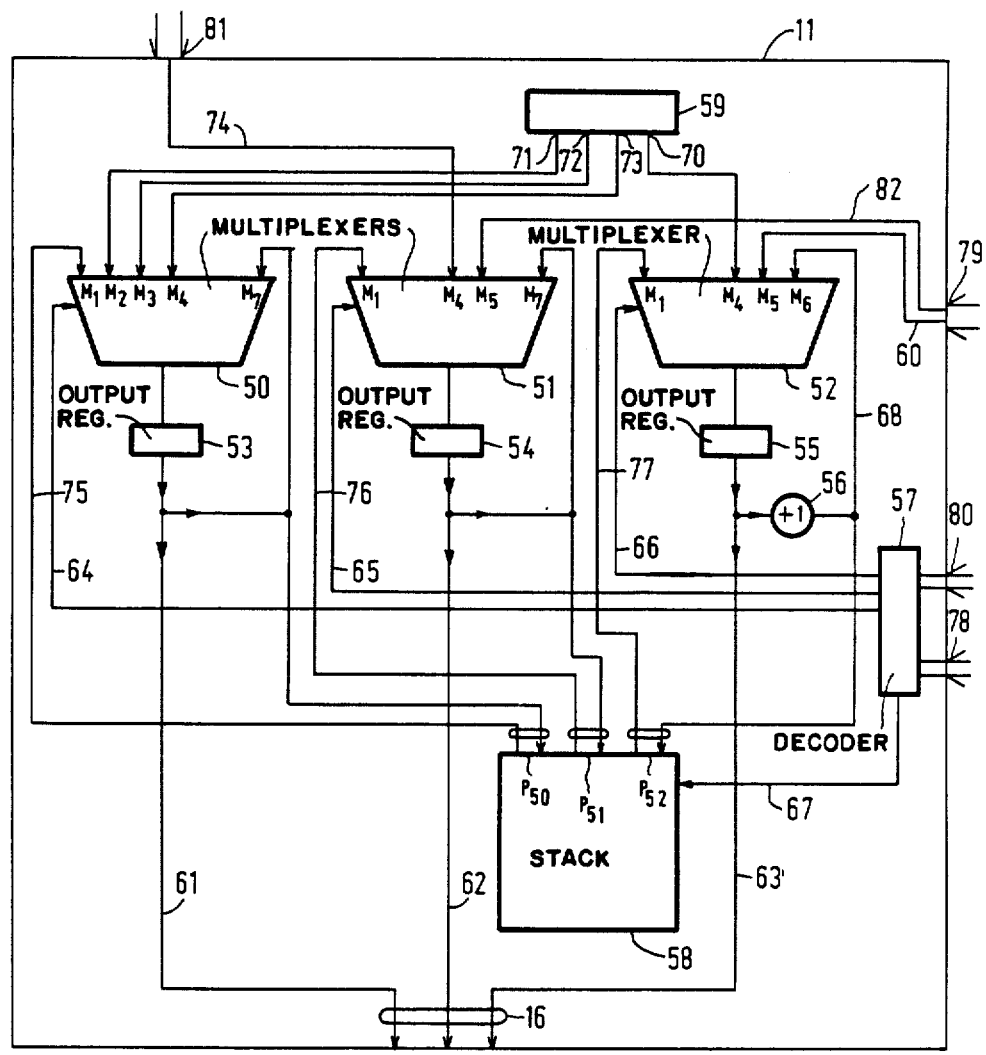
FIG. 4 shows a possible implementation of a sequencer which forms part of the control section of a data processor in accordance with the invention.

FIG. 4 shows an example of a possible implementation of a sequencer. For each portion of said triplet, the sequencer 11 comprises one multiplexer, that is to say a multiplexer 50 for the portion I, a multiplexer 51 for the portion II and a multiplexer 52 for the portion III. Each multiplexer (50, 51, 52) is provided with its own output register (53, 54, 55). Each output register is connected to a relevant output line 61, 62, 63 which together constitute the output gate system 16 of the sequencer, on said output gate system 16 there is supplied the triplet address for the addressing of the sparse memory. The sequencer also comprises a stack 58, which is a "last-in, first-out" register, and also a "plus 1" element 56, a decoder 57 and a contant-generator 59. The function of these elements and how they are connected in the sequencer will be described in detail hereinafter. For the sake of clarity, the connection lines are shown as single lines in the Figure; however, it will be evident that many of these lines are in fact suitable for the transport of signals having a width of several bits. The stack 58 comprises three data inputs and three data outputs, each data input being each time paired with a respective data output. Each pair is connected to a given multiplexer and, conversely, an input/output pair of the stack is associated with each multiplexer. The data input of the pairs $P_{50}$, $P_{51}$ is connected to the output lines 61, 62, respectively, of the multiplexes 50, 51, respectively. The data output of the pairs $P_{50}$, $P_{51}$ are connected to the input gate $M_1$ of the multiplexers 50, 51, respectively. The data output of the pair $P_{52}$ is connected to the input gate $M_1$ of the multiplexer 52. The data input of the pair $P_{52}$ is connected to an output of the "plus 1" element 56.

As has already been described with reference to FIG. 2, the sequencer has four inputs, that is to say a first input 80 which is connected to a condition register (13 in FIG. 2), a second input 81 which is connected to an instruction register (10 in FIG. 2), a third input 78 and a fourth input 79, each of which is connected to an output of the micro-code register (14 in FIG. 2). Each micro-instruction word comprises a micro-operational code which will be referred to hereinafter as a micro-opcode, and a micro-address field. The micro-opcode is presented to the third input 78 and the micro-address field is presented to the fourth input 79 of the sequencer.

The micro-opcode specifies the method of calculating the address of the next micro-instruction step for the execution of the handler. The third input 78 of the sequencer is connected to a first input of the decoder 57. A second input of this decoder is connected to the first input 80 of the sequencer. This decoder decodes the conditions originating from the condition register (13 in FIG. 2) and the micro-opcode. The decoded signal controls the three multiplexers (50, 51, 52) and also the stack 58. To this end, a first output of the decoder is connected, via a connection line 64, to a control input of the multiplexer 50. A second and a third output of the decoder are connected, via the connection lines 65, 66, respectively, to control inputs of the multiplexers 51 and 52 respectively. A fourth output of the decoder is connected, via the connection line 67, to a control input of the stack 58. In dependence upon the decoded signal applied to its control input, each multiplexer is switched to a given state so that one of its input gates is selected and the signal present on this input gate is transported to the associated output register. This embodiment involving a separate decoder 57 is only one of several feasible solutions. Another solution is, for example to provide each multiplexer as well as the stack with a separate decoder and to present the micro-opcode as well as the condition signals originating from the condition register directly to the multiplexer and the stack. The choice of a particular one of these two solutions has no direct consequences for the operation of the sequencer, because both solutions offer exactly the same result. This choice is actually of importance only for the realization in accordance with a chosen technology of a sequencer in accordance with the invention.

The operation of the sequencer will now be described with reference to various feasible micro-opcodes. These micro-opcodes are, for example:
  (a) NEXT: Address the micro-instruction word within the handler being executed which is located at the address having an address value which is exactly one unit higher than the address at which this micro-opcode is located (address + 1 = new address).
  (b) BRANCH: Address the micro-instruction word within the handler being executed which is located at the address as given in the associated microaddress field which in this case represents the portion III of the triplet. In this micro-opcode a distinction can be made between a non-conditional branch and a conditional branch. In the case of a non-conditional branch, the address given in the micro-address field is always addressed. In the case of a conditional branch, however, the address is addressed only if the selected condition is satisfied.
  (c) JUMP: Address a handler of the same type but bearing a number other than the handler being executed. The number of the handler to be addressed is given in the associated micro-address field.
  (d) NEXT INSTRUCTION: Select the next instruction handler on the basis of the next macro-instruction in the instruction register.
  (e) JSR: Address a handler of the first type, that is to say a micro-subroutine, and place the address of the micro-instruction following the JSR-instruction on the stack.
  (f) RETURN: Fetch the micro-address from the stack.
  (g) JUMP SP: Address a handler of the second type, that is to say a special handler.

The processing of each of these micro-opcodes by the sequencer will now be described in detail. The same order of the micro-opcodes will be used.
  (a) NEXT.

The output register 55 of the multiplexer 52 has outputted, via the output line 63, the portion III of the triplet address of a micro-instruction word to be fetched. This micro-instruction word to be fetched has the microopcode "NEXT". The "plus 1" element 56 which has an input connected to the output line 63 adds one unit to said portion III of the triplet address present on the output line 63 (address i→address i+1). The address incremented by one unit is presented to the input gate M6 of the multiplexer 52 via the line 68. The decoder 57 decodes the micro-opcode "next". Under the control of the decoded "next" signal on the line 66, the input gate M6 of the multiplexer 52 is selected. Consequently, the incremented portion III of the triplet address is transported to the output gate system 16 via the output register 55 and the line 63. The decoded "next" signals on the lines 65 and 64 ensure that the input gates M7 of the multiplexers 51 and 50, respectively, are selected and that the signal on each of these input gates is stored in the relevant output register. For the multiplexers 50 and 51 the input gate M7 is each time directly connected to the output of its relevant output register. Via the lines 61 and 62, the portions I and II, respectively, of the triplet are transported to the output gate system 16. Consequently, in the case of a micro-opcode "next" only the portion III of the triplet address is modified, while the portions I and II remain the same. Consequently, the next instruction word of the same handler of the same type is addressed. The address signal applied to the output gate system 16 then has the form (M7, M7, M6) (address signal as presented to the input gate of the respective multiplexers selected by this micro-opcode). Under the control of the decoded "next" signal on the line 67, the stack 58 remains inactive.
  (b) BRANCH.

1. Non-conditional: The address of the microinstruction word to be addressed is given in the microaddress field of the micro-instruction word containing "branch" as the micro-opcode. This address (portion III of the triplet) is applied to the sequencer via the input 79 and subsequently to the input gate M5 of the multiplexer 52 via the line 60. The decoder 57 decodes the micro-opcode "branch". Under the control of the decoded "branch" signal on the line 66, the input gate M5 of the multiplexer 52 is selected. Consequently, the portion III of the triplet of the address to be addressed is transported to the output gate system 16 via the output register 55 and the line 63. Because the micro-instruction word to be addressed is present within the same handler of the same type, the portions I and II of the triplet remain unmodified. This is achieved by the selection of the signals on the input gate M7 of the multiplexers 50 and 51 as described for the micro-opcode "next". The address signal applied to the output gate system 16 now has the form (M7, M7, M5). Under the control of the decoded "branch" signal on the line 67, the stack 58 remains inactive. This is true also for a conditional branch. 2. Conditional: If the micro-opcode is conditional, this condition is applied to the decoder 57 via the input 80. Depending on this condition the decoder will select, via a control signal on the line 66, the input gate M5 of the multiplexer 52 when the condition is satisfied (branch) or the input gate M6 of the multiplexer 52 when the condition is not satisfied (no branch, so "next").

(c) JUMP:

The address of the handler to be addressed, in this case the number of this handler, is given in the micro-address field of the micro-instruction word containing "jump" as the micro-opcode. This address (portion II of the triplet) is applied to the sequencer via the input 79, after which it is applied, via the line 82, to the input gate M5 of the multiplexer 51. The decoder 57 decodes the micro-opcode "jump". Under the control of the decoded "jump" signal on theline 65, the input gate M5 of the multiplexer 51 is selected. Under the control of the decoded "jump" signal on the line 67, the stack 58 remains inactive. The decoded "jump" signal on the line 66 selects the input gate M4 of the multiplexer 52. The input gate M4 of the multiplexer 52 is connected to an output 70 of the constant-generator 59. The constant-generator 59 always outputs an address signal on its output 70 which characterizes the portion III of the triplet address of a first micro-instruction word of a handler. In the example shown in FIG. 3d, the address signal "000" would appear on the output 70 of the generator. The decoded "jump" signal on the line 64 selects the input gate M7 of the multiplexer 50. The address gianl presented to the output gate system 16 now has the form (M7, M5, M4).

(d) NEXT INSTRUCTION:

The decoder 57 decodes the microopcode "next instruction". Under the control of the decoded "next instruction" signal on the line 66, the input gate M4 of the multiplexer 52 is selected. The input gate M4 is connected to the output 70 of the constant-generator 59 which outputs an address signal as described above for the micro-opcode "jump". Under the control of the decoded "next-instruction" signal on the line 65, the input gate M4 of the multiplexer 51 is selected. The input gate M4 of the multiplexer 51 is connected, via the line 74, to the next macro-instruction is applied to this input 81 which is connected to the instruction register (10 in FIG. 2). The (address) number of the handler to be selected is formed on the basis of the opcode present in the instruction register; for example by supplying the opcode present in the instruction register 10 to input M4 of multiplexer 51. Under the control of the decoded "next-instruction" signal on the line 64, the input gate M4 of the multiplexer 50 is selected. The input gate M4 of the multiplexer 50 is connected to the output 73 of the constant-generator 59. The output 73 of this constant generator 59 always outputs an address signal which characterizes the portion I of the triplet address for an instruction handler (handler of the third type). Under the control of the decoded "next-instruction" signal on the line 67, the stack 58 remains inactive. In the example shown in FIG. 3d, the output 73 of the constant-generator will output the address signal "10". The address signal presented to the output gate system 16 now has the form (M4, M4, M4).

(e). JSR:

The decoder 57 decodes the micro-opcode "JSR". Under the control of the decoded "JSR" signal on the line 66, the input gate M4 of the multiplexer 52 is selected (same as for micro-opcode "jump"). Under the control of the decoded "JSR" signal on the line 65, the input gate M5 of the multiplexer 51 is selected. The number of the handler within the micro-subroutine is applied to the input gate M5 of the multiplexer 51. This number originates from the micro-address field applied to the input 79 (as for the micro-opcode "jump"). Under the control of the decoded "JSR" signal on the line 64, the input gate M2 of the multiplexer 50 is selected. The input gate M2 of the multiplexer 50 is connected to the output 71 of the constantgenerator 59. The output 71 of this constant-generator 59 always outputs an address signal which is characteristic of the portion I of the triplet address for a microsubroutine (handler of the first type). In the example shown in FIG. 3d, the address signal "00" would appear on the output 73 of the constant-generator. The address signal presented to the output gate system 16 now has the form (M2, M5, M4). Under the control of the decoded "JSR" signal on the line 67, the stack 58 is activated. The stack performs a "push" operation. This means that on the top of the stack the triplet (j, k 1+1) is written if (j, k, 1) was the address of this micro-instruction word with the micro-opcode "JSR".

(f) RETURN:

When the decoder 57 decodes the micro-opcode "return", the input gate M1 of each multiplexer 50, 51, 52 is selected under the control of this decoded signal on the lines 64, 65 and 66. The input gate M1 of each multiplexer is connected to an associated output of the stack 58. Under the control of the decoded "return" signal on the line 67, the stack performs a "pop" operation; this is an operation during which the top element of the stack is fetched in order to be removed therefrom. The address signal presented to the output gate system 16 now has the form (M1, M1, M1).

(g) JUMP SP:

The operation for the multiplexers 51 and 52 for this micro-opcode is completely analogous to the operation described for the micro-opcode "JSR". For the multiplexer 50, however, the input gate M3 is selected under the control of the decoded "jump SP" signal on the line 64. The input gate M3 of the multiplexer 50 is connected to the output 72 of the constant-generator 59. The output 72 of this constant-generator always outputs an address signal which characterizes the portion I of the triplet address for a special handler (handler of the second type). In the example shown in FIG. 3d, the output 72 of the constant-generator will output the address signal "01". The address signal presented to the output gate system 16 now has the form (M3, M5, M4). Under the control of the decoded "JUMP SP" signal on the line 67, the stack 58 remains inactive.

Figure 5:
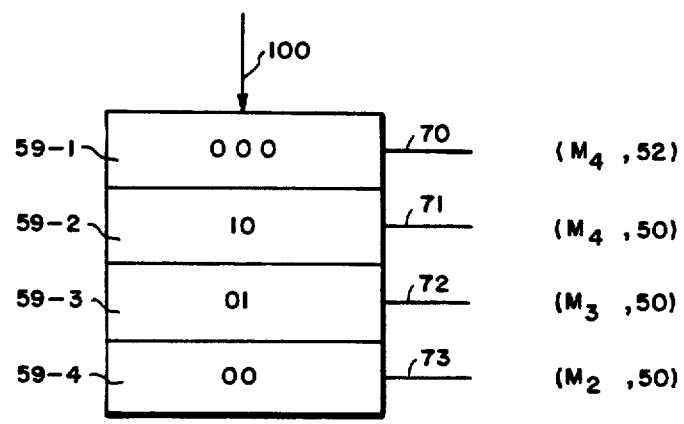
FIG. 5 shows an example of a constant generator.

The constant generator is formed by a memory or a set of at least four registers. In the example of FIG. 5 the constant generator is formed by four registers 59-1, 59-2, 59-3 and 59-4 which store respectively the values 000, 10, 01 and 00. Each register has an output line (70, 73, 72 and 71 respectively) for supplying its content to the multiplexer to which it is connected. Suppose now that under control of a decoded "jump" signal on line 66 the input gate M4 of multiplexer 52 is selected. In this case the value "000" is oututted from register 59-1 and supplied via line 70 to input M4. The constant generator 59 thus supplies constant values to dedicated inputs of the multiplexer (50, 52). The value "10" stored in register 59-1 is supplied for the micro-opcode "next instruction" and the value "01" and the value "00" are supplied for the micro-opcode "jump sp" and "JSR", respectively. The output of the registers can be enabled by a control signal on line 100. This control signal can be generated by the decoder 57.

What is claimed is:

1. A data processor comprising a processing section for executing micro-instructions, a control section comprising a microcode memory and a sequencer connected to said processing section for converting macro instructions into micro instructions and an instruction register, an output of which is directly connected to a first input of said sequencer, said microcode memory storing a number of handlers, each of which comprises at least one microinstruction word, a second input of said sequencer being connected to a data output of said microcode memory while a first output of said sequencer is connected to an address input of said microcode memory, said sequencer furthermore comprising an address generator for generating addresses for said microinstruction words, which address generator comprises a first sub-address generator for generating a first sub-address for addressing a handler within said number of handlers and a second sub-address generator for generating a second sub-address for addressing an individual microinstruction word within said handler addressed by said first sub-address, said first and second sub-addresses each determining an exclusive portion of said address, said microcode memory having m microinstruction word storage locations and being provided with an address decoder having n address input bit lines, where $2^n$ is greater than m, which address decoder includes an AND-gate corresponding to each storage location and having its output connected to said correspondig storage location, said AND-gates being each provied with the same mumber of input lines which together with said address bit lines form a matrix to define address bit decoding cells at the cross-points thereof, said cross-points being programmed so that said address decoder will address a storage location for each of m n-bit addresses applied to said address bit lines.

2. A data processor as claimed in claim 1, characterized in that said number of handlers is made up from at least two different groups of handlers, and in that said first sub-address generator comprises first and second sub-address-portion generators for generating a first sub-address-portion for addressing an individual group within said different groups and a second sub-address-portion for addressing an individual handler within said group addressed by said first sub-address-portion.

3. A data processor as claimed in claim 2, wherein said handlers of one group are selected on the basis of macroinstructions and said handlers of another group are selected on the basis of microinstructions.

* * * * *